(12) United States Patent
D'Souza et al.

(10) Patent No.: US 6,992,682 B1
(45) Date of Patent: Jan. 31, 2006

(54) METHOD FOR COLOR MANAGEMENT ON A DISPLAY DEVICE

(75) Inventors: Henry M. D'Souza, Houston, TX (US); William H. Nott, Spring, TX (US); Gokalp Bayramoglu, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 575 days.

(21) Appl. No.: 09/499,160

(22) Filed: Feb. 7, 2000

(51) Int. Cl.
*G09G 5/02* (2006.01)

(52) U.S. Cl. ...................................................... 345/589
(58) Field of Classification Search .................. 345/22, 345/589, 591, 592, 593, 604
See application file for complete search history.

(56) References Cited

U.S. PATENT DOCUMENTS

| | | | |
|---|---|---|---|
| 4,349,279 A | * 9/1982 | Jung | 356/402 |
| 4,857,899 A | 8/1989 | Ishii | 340/701 |
| 5,070,413 A | 12/1991 | Sullivan et al. | 358/456 |
| 5,311,294 A | 5/1994 | Cromer et al. | |
| 5,384,901 A | 1/1995 | Glassner et al. | 395/131 |
| 5,406,310 A | 4/1995 | Aschenbrenner et al. | 345/150 |
| H1506 H | * 12/1995 | Beretta | 345/199 |
| 5,479,186 A | 12/1995 | McManus et al. | 345/11 |
| 5,512,961 A | 4/1996 | Cappels, Sr. | |
| 5,561,459 A | * 10/1996 | Stokes et al. | |
| 5,561,751 A | 10/1996 | Wong | 395/131 |
| 5,638,117 A | 6/1997 | Engeldrum et al. | |
| 5,652,831 A | 7/1997 | Huang et al. | 395/131 |
| 5,740,076 A | 4/1998 | Lindbloom | 364/514 R |
| 5,754,222 A | 5/1998 | Daly et al. | 348/184 |
| 5,821,917 A | 10/1998 | Cappels | 345/150 |
| 5,926,617 A | 7/1999 | Ohara et al. | 395/109 |
| 5,956,015 A | 9/1999 | Hino | 345/153 |
| 6,075,888 A | 6/2000 | Schwartz | 382/167 |
| 6,438,445 B1 | * 8/2002 | Yoshida et al. | 700/173 |
| 6,459,425 B1 | * 10/2002 | Holub et al. | 345/207 |
| 2001/0011389 A | * 10/1996 | Parulski et al. | 348/207 |
| 2001/0013894 A1 | * 8/2001 | Parulski et al. | |

FOREIGN PATENT DOCUMENTS

WO      WO 00/29935      5/2000

OTHER PUBLICATIONS

International Electrotechnical Commission, *Colour Measurement and Management in Multimedia Systems and Equipment*, 19 pp., (Jan. 1, 1998).

Charles Poynton, *Frequently Asked Questions about Color*, http://www.inforamp.net/~poynton/notes/colour_and_gamma/ColorFAQ.html#TRFToC; 24 pp., (Dec. 30, 1999).

(Continued)

*Primary Examiner*—Jeffrey Brier
*Assistant Examiner*—G. F. Cunningham

(57) ABSTRACT

Disclosed is a method and apparatus for controlling color displayed on a color monitor. The method includes, in one embodiment, the steps of: activating a first color scheme on the monitor; responsive to the activating of the first color scheme, measuring a first color point of the monitor; storing the first color point within a memory associated with the monitor; activating a second color scheme on the monitor; responsive to the activating of the second color scheme, measuring a second color point of the monitor; storing the second color point within the memory associated with the monitor; activating a third color scheme on the monitor; responsive to the activating of the third color scheme, measuring a third color point of the monitor; and storing the third color point within the memory associated with the monitor.

32 Claims, 5 Drawing Sheets

OTHER PUBLICATIONS

Charles Poynton, *Frequently Asked Questions about Gamma*, http://www.inforamp.net/~poynton/notes/colour_and_gamma/ColorFAQ.html#RTFoC; 13 pp., (Dec. 30, 1999).

*Web Color Calibration Issues*, by Lynda Weinman, http://www.webtechniques.com/archives/1998/11/desi/; Oct. 31, 2000, 7 pps.

*An Overview of Technology, Benefits and Opportunities of True Internet Color*, E–Color ©, Rev.080800dta, 11 pps.

* cited by examiner

METHOD FOR COLOR MANAGEMENT ON A DISPLAY DEVICE

BACKGROUND OF THE INVENTION

1. Field of the Invention

The present invention relates to color management in computer monitors and, in particular but not by way of limitation, to systems and methods for correcting colors displayed on computer monitors and to systems for displaying those corrected colors.

2. Background and Related Art

In computer systems, the digital representation of color is in terms of variable mixes of three basic colors: red, green and blue (RGB). The human visual system predictably perceives the close juxtaposition of these three basic colors as one resultant color. This illusion is the basis for color image processing. That is, it is possible to manipulate the intensity mix of the three basic colors (red, green, and blue) to cause a viewer to perceive various desired color shades. In fact, a whole range of colors may be perceived in this manner.

In present computer graphics systems, red, green and blue colors are mixed by a graphics controller that usually handles the intensity control of each basic color using a 6–8 bit control—referred to as an intensity value. Generally, the working range of intensity values are from 0 to 255, 0 meaning that the corresponding basic color is completely dark (at 0%) and 255 meaning that the corresponding basic color is at maximum intensity (at 100%). Intensity values between 0 and 255 produce corresponding, but not necessarily, proportional changes in actual displayed brightness for the corresponding color and, thus, corresponding changes in resulting perceived color.

For a high fidelity color system, the monitor must predictably display the correct shade of color that is represented by any mix of red, green and blue. However, a monitor can only display the correct shade of color if the intensities of each color component can be precisely controlled. Present display systems generally lack such precise control and, accordingly, display inaccurate colors. That is, because most computer systems cannot precisely control color intensities, a particular mix of colors may be viewed on one monitor, for example, as blue and on another monitor as blue-green.

In most cases, the variances in basic color points from one monitor to the next are only slight. However, even these small variances can result in a viewer perceiving different colors. The need for each monitor to display the same color is becoming more critical with the growth of web-based commerce. For example, retailers need to provide electronic shoppers with accurate depictions of their products. In particular, clothing retailers need to provide electronic shoppers with accurate colors, i.e., the "true-color", of their products. Unless the retailer can convey the actual color of their products to its customers, those customers likely may become disappointed because the product that they received is different from the product that they thought that they ordered.

Presently, sRGB monitors have the ability to precisely control color intensities and, thus, the ability to display accurate colors. sRGB monitors, however, are very difficult to manufacture and are prohibitively expensive. Accordingly, attempts have been made to adjust typical computer monitors to more accurately display colors. These attempts have generally been less than satisfactory because they either require human intervention (thereby interjecting a subjective element to color determination) or make color adjustments based only on insufficient data of the monitor.

Accordingly, a method and apparatus are needed to solve the above-described and other well-known problems with existing technology. In particular, but not by way of limitation, a method and apparatus are needed for producing true-color on a standard monitor without manual adjustment.

SUMMARY OF THE INVENTION

To remedy the deficiencies of existing systems and methods, the present invention provides a method and apparatus to control colors displayed on a color monitor and an apparatus to display the controlled colors.

In one embodiment, the present invention includes the steps of: activating a first color scheme on a monitor; responsive to the activating of the first color scheme, measuring a first color point of the monitor; storing the first color point within a memory associated with the monitor; activating a second color scheme on the monitor; responsive to the activating of the second color scheme, measuring a second color point of the monitor; storing the second color point within the memory associated with the monitor; activating a third color scheme on the monitor; responsive to the activating of the third color scheme, measuring a third color point of the monitor; and storing the third color point within the memory associated with the monitor. Moreover, in different embodiments the present invention can include further or even alternative elements as described herein and as would be obvious to those of ordinary skill in the art.

BRIEF DESCRIPTION OF THE DRAWINGS

Various objects and advantages and more complete understanding of the present invention are apparent and more readily appreciated by reference to the following Detailed Description and to the appended claims when taken in conjunction with the accompanying Drawings wherein:

DETAILED DESCRIPTION

Figure 1:
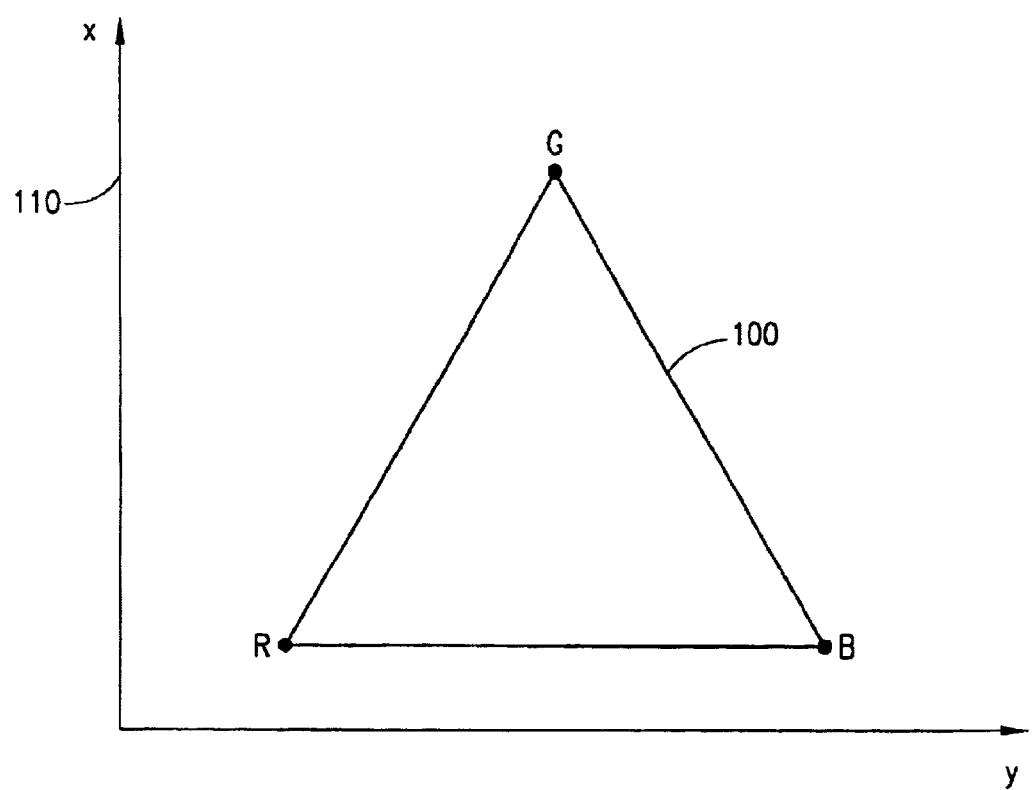
FIG. 1 illustrates a gamut defined by sRGB color points.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalences and alternative constructions that fall within the spirit and scope of the invention as expressed in the claims.

Referring now to FIG. 1, there is illustrated an sRGB gamut 100 (range of color) defined by sRGB color points. The sRGB gamut 100 includes the area inside the triangle defined by points R (red), G (green), and B (blue). Moreover, the sRGB gamut 100 is mapped in CIE 1931 chromiticity x-y space 110.

Ideally, a computer monitor should be able to predictably display any color inside the sRGB gamut 100 based upon a mix of red, green and blue (a RGB value) Unfortunately, such monitors are rare and prohibitively expensive.

Figure 2:
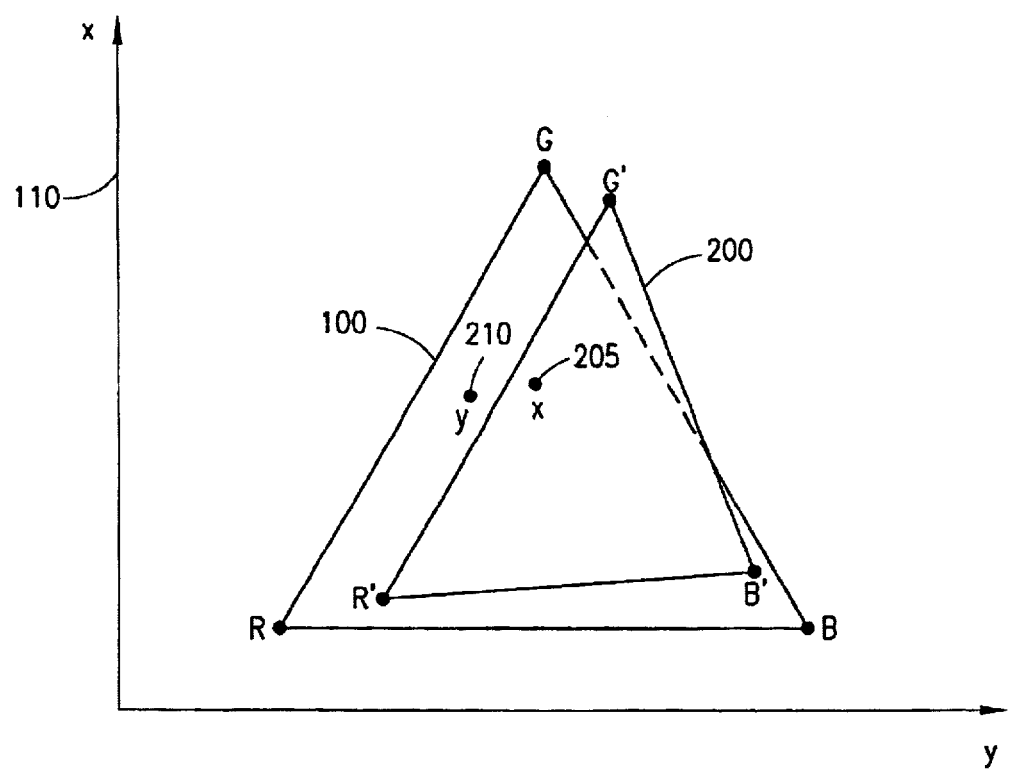
FIG. 2 illustrates the gamut of FIG. 1 with an overlay of a gamut representative of the color points of a typical computer monitor.

Rather than displaying colors within the sRGB gamut 100, most monitors perform within a slightly different color range. For example, FIG. 2 illustrates the R'G'B' gamut 200 representative of a typical computer monitor. The R'G'B' gamut 200 includes the area inside the triangle defined by points R', G' and B'. Although the sRGB gamut 100 and the R'G'B' gamut 200 overlap substantially, the differences are often significant enough to cause perceivable variances in color. For example, a non-sRGB monitor that received the RGB values (100%, 100%, 15%) (for simplicity, the RGB values are being expressed as a percentage of the maximum intensity for each color) would generate a color approximately equal to color point x 205. A sRGB monitor receiving the same RGB value, on the other hand, would generate a color approximately equal to color point y 210. Thus, even though the RGB values given to both monitors are the same, the actual colors generated by the monitors are different.

To ensure that the same RGB values produce the same color (or at least as close as possible) on all monitors, the RGB values given to non-sRGB monitors should be adjusted, i.e., corrected. However, because each monitor is different (i.e., each monitor has different R, G and B color points) individual properties of each monitor must be known before any correction can be performed. For example, R', G' and B' (as shown in FIG. 2) must be known if color point x 205 is to be mapped to color point y 210. (As one skilled in the art can appreciate, a monitor that has an associated gamut such as the R'G'B' gamut 200 cannot produce an exact color equivalent to color point y 210 because the R'G'B' gamut 200 does not include color point y 210. However, color point y 210 can be approximated within the limits of the monitor as described herein.)

The individual properties of each monitor can be measured at the factory during the manufacturing process. In particular, red, green and blue color points for an individual monitor (e.g., R', G' and B') can be measured with a calorimeter or similar device. These measured color points can then be stored within the monitor. For example, the measured color points could be stored at a memory 305 housed inside the monitor (shown in FIG. 3). As one skilled in the art can appreciate, the memory 305 can be of any type, but good results have been achieved by using non-volatile memory devices including ROMS, EPROMs, EEPROM, magnetic storage, etc.

Figure 3:
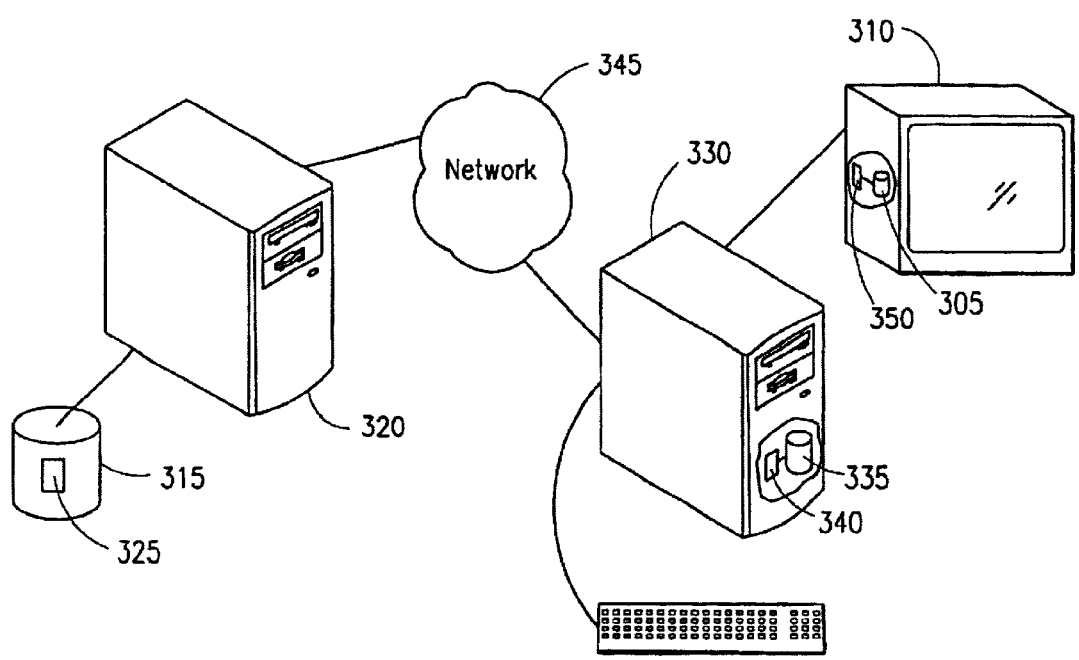
FIG. 3 illustrates a computer system constructed in accordance with the principles of the present invention.

Alternatively, these measured color points could be stored remotely from the monitor 310 such as at a database 325 stored on storage device 315, which is attached to a server 320 (shown in FIG. 3). When the color point data is stored remotely from the monitor 310, it is stored in association with the serial number of each monitor 310 (which may be stored in the memory 305).

Whether stored locally within the monitor 310 or remotely on a database 325, the color point data can be retrieved and used for correcting RGB values. For example, when the color point data is stored at the monitor 310, the computer 330 can read the data during boot-up and store the information within an internal memory 335. The processor 340 can then use these color points to perform correction calculations on RGB values associated with images to be displayed on the monitor 310. In one embodiment, the correction calculations are only performed at the request of the viewer. That is, the user must actively select a picture or series of pictures (e.g., clothing from a retailer) to be displayed in true-color. All other images are displayed according to non-corrected RGB values.

When the color point data is stored at a remotely-stored database 325, the computer 330 reads the color point data from that database 325. First, however, the computer must read the serial number from the monitor 310. The computer 330 then can pass that serial number through a network 345 and server 320 to the database 325. The database 325 can then return the proper color point data for the particular monitor 310. That data can be stored at the memory 335 for further use.

Unless the monitor 310 attached to the computer 330 is changed, the database is not necessarily accessed again. To determine if the monitor has changed, the computer may periodically poll the monitor 310. Alternatively, the serial number of the monitor 310 may be checked during boot-up.

Once the computer 330 obtains the color points for the attached monitor 310, the computer 330 can process RGB values to produce corrected RGB values that better approximate the intended color. Moreover, another embodiment of the present invention includes an internal processor 350, microcontroller or similar circuitry located within the output stage of the video subsystem (not shown) in the computer 330. In this embodiment, the computer 330 sends uncorrected RGB values to the monitor 310 and the internal processor 350 associated with the monitor 310 computes and applies the corrected RGB values.

Figure 4:
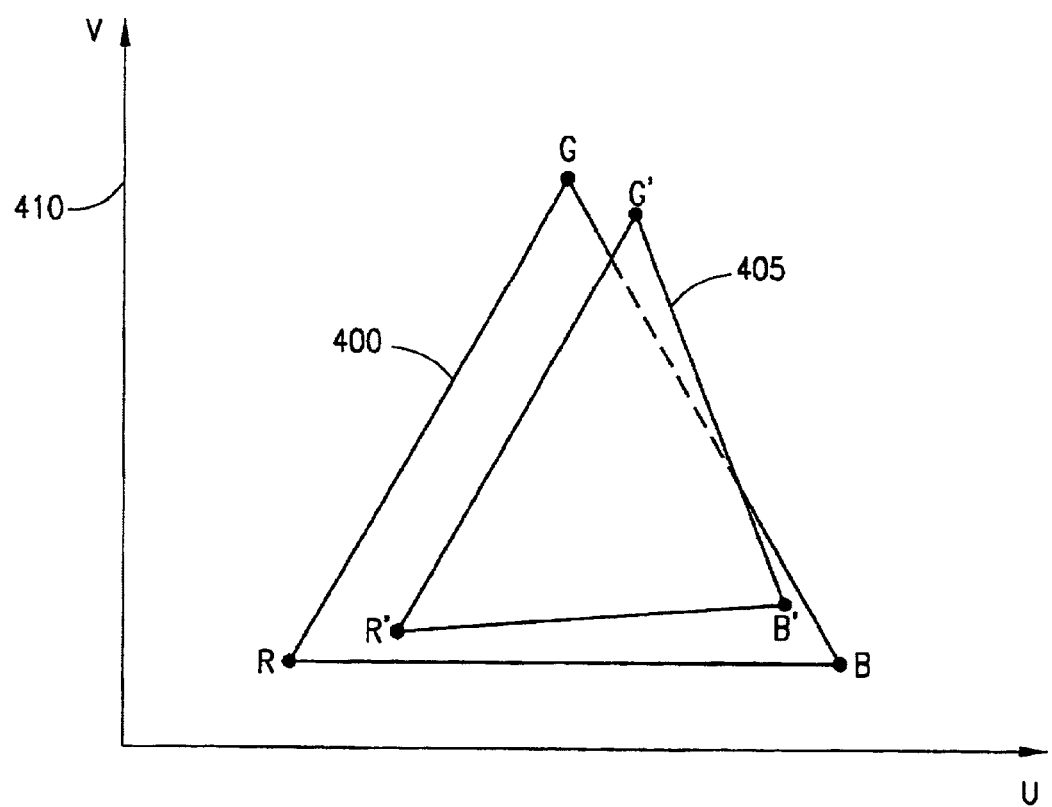
FIG. 4 illustrates an sRGB color gamut with an overlay of a gamut representative of a typical computer monitor, both of which are in the u-v plane.
Figure 5:
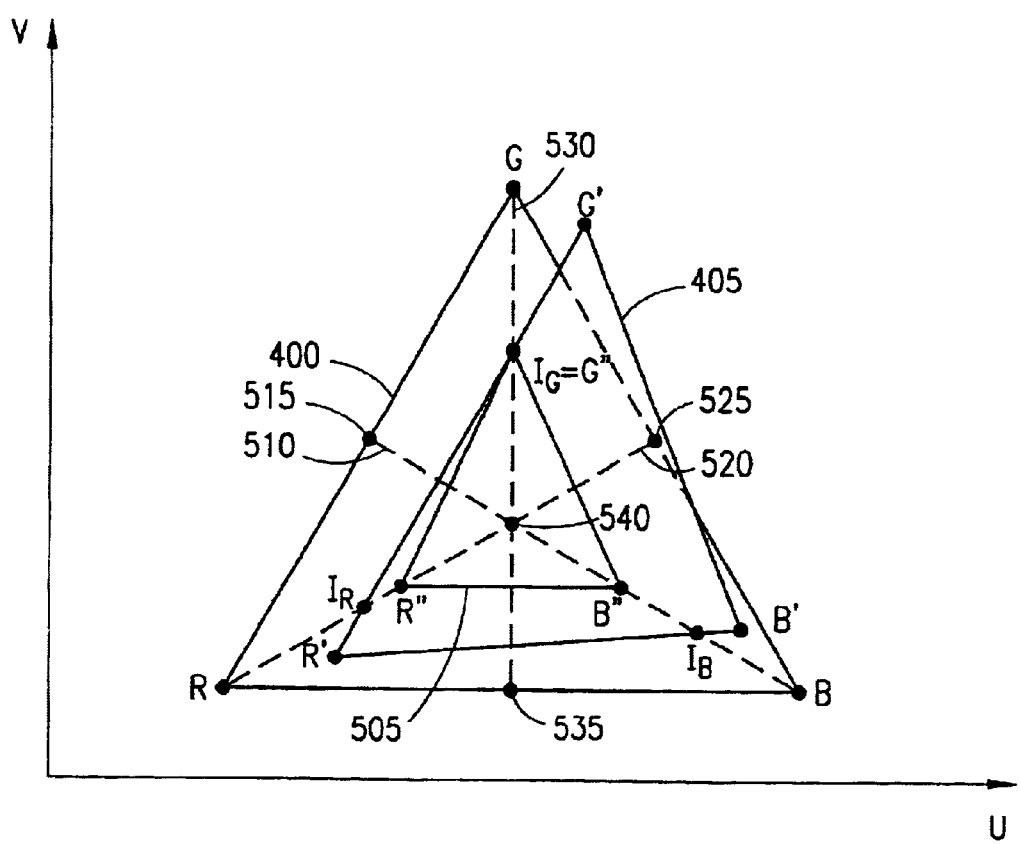
FIG. 5 illustrates a parametrically reduced gamut, which is in the u-v plane.

Once the processor (whether processor 340 or internal processor 350) receives the color point data for the attached monitor 310, that data must be manipulated to produce the corrected RGB values. FIGS. 4 and 5 illustrated the process for manipulating that data.

Referring first to FIG. 4, there is illustrated an sRGB color gamut 400 with an overlay of a R'G'B' gamut 405 representative of a typical computer monitor. Instead of being mapped in the x-y plane 110 like FIG. 1, these gamuts are mapped in the u-v plane 410 because RGB values do not map linearly into the x-y plane 110. That is, it is not possible in the x-y plane to predict by linear combination the results of adding given intensities of red, green and blue. However, by mapping the x-y coordinates of the color points to u-v coordinates, a linear color space is produced in which it is entirely possible to predict the resulting color point coordinates when intensities of red, green and blue are added. The x-y coordinates are mapped to the u-v coordinates according to two relationships: $u=4x/(-2x+12y+1)$ and $v=9y/(-2x+12y+1)$.

Once the relevant color gamuts have been mapped to the u-v plane, color correction can be achieved by applying an attenuation and mixing matrix to the RGB values associated with a particular picture. In one embodiment, this matrix is calculated at the factory and stored directly with the corresponding monitor 310. The stored matrix can then be supplied to the computer 330 connected with the monitor 310. Other embodiments, however, require that the computer 330 calculates the matrix using the color points associated with the monitor 310.

To calculate the matrix, an iterative error minimizing technique is used wherein the matrix is defined by:

$$A = \begin{vmatrix} a_{rr} & a_{rg} & a_{rb} \\ a_{gr} & a_{gg} & a_{gb} \\ a_{br} & a_{bg} & a_{bb} \end{vmatrix}$$

such that the following hold true:

$UR_c=[Yr*a_{rr}*UR+Yg*a_{rg}*ug+Yb*a_{rb}*ub]/[Yr*a_{rr}+Yg*a_{rg}+Yb*a_{rb}]$ $UG_c=[Yr*a_{gr}*UR+Yg*a_{gg}*ug+Yb*a_{gb}*ub]/[Yr*a_{gr}+Yg*a_{gg}+Yb*a_{gb}]$ &

$UB_c=[Yr*a_{br}*UR+Yg*a_{bg}*ug+Yb*a_{bb}*ub]/[Yr*a_{br}+Yg*a_{bg}+Yb*a_{bb}]$

Although only the $UR_c$, $Ug_c$, $Ub_c$ are discussed, one skilled in the art would recognize that the same equations hold true for $VR_c$, $VG_c$, $VB_c$. The matrix can then be applied to RGB values to produce corrected RGB values such that:

$$[R, G, B] = [R_c \ G_c \ B_c] * \begin{vmatrix} a_{rr} & a_{rg} & a_{rb} \\ a_{gr} & a_{gg} & a_{gb} \\ a_{br} & a_{bg} & a_{bb} \end{vmatrix}$$

where $R_c$, $G_c$, and $B_c$ are the corrected RGB values and Yr, Yg, and Yb are the intensity values for each color.

If, however, the gamut of the monitor is not completely contained inside the sRGB gamut 400, parametric reduction must be applied before the corrected RGB values can be calculated. Thus, for the R'G'B' gamut 405 shown in FIG. 4, parametric reduction should be applied before the corrected RGB values are calculated.

Referring now to FIG. 5, there is illustrated a parametrically reduced gamut, gamut R"G"B" 505, used in calculating the corrected RGB values for a monitor with the R', G', and B' color points. The sRGB gamut 400 of FIG. 5 (associated with a sRGB monitor) is defined by three points R, G and B by having the coordinates R[u,v], G[u,v], and B[u,v]. The R'G'B' gamut (associated with, for example, monitor 310 shown in FIG. 3) is defined by points R'G'B' having the coordinates R'[u,v], G[u,v], and B[u,v]. Moreover, each side of the sRGB gamut 400 is intersected by a bisecting line. For example, side GR is bisected by line 510 running from point B. In terms of RGB values (not [u,v] values) the bisecting line would run from (0% R, 0% G, 100% B) (point B) to (100% R, 100% G, 0% B) (point 515). Similarly, side GB would be bisected by line 520 running from point R to point 525, and side RB would be bisected by line 530 running from point G to point 535. The three lines intersect at point 540, also known as the white point. Point 540 is represented by RGB values (100% R, 100% G, 100% B).

R'G'B' gamut 405 intersects each of the bisecting lines 510, 520, 530. For example, line 530 is intersected at point $I_G$, line 520 at point $I_R$, and line 510, at point $I_B$. These intersection points $I_R$, $I_G$, $I_B$ are used for parametric reduction. That is, these intersection points are used to define a new reduced gamut.

Still referring to FIG. 5, there is illustrated a reduced gamut, R"G"B" gamut 505, which is defined by three points: R", G" and B". To define the R"G"B" gamut 505, first the minimum of $I_R$, $I_G$, and $I_B$ is located, i.e., the point closest to the white point 540 is located. Although any one of $I_R$, $I_G$, and $I_B$ could be the minimum point, for explanation purposes only, $I_G$ (which is also G") is assumed to be the minimum point.

Using $I_G$ as the minimum point, points R" and B" (the remaining two points of the triangle defining the R"G"B" gamut) are calculated. These two points fall on the bisection lines 510 and 520 because the R"G"B" gamut 505 is in the same family of triangles as the sRGB gamut 400. (The two gamuts define triangles that only differ in size.) Thus, the white point for the sRGB gamut 400 (point 540) is also the white point for the R"G"B" gamut 505. Moreover, it necessarily follows that lines 510, 520, and 530 bisect the R"G"B" gamut 505 just as they bisect the sRGB gamut 400.

The R"G"B" gamut 505 can be expressed as a percentage of the sRGB gamut 400. For example, the R"G"B" gamut 505 is 75% of the size of the sRGB gamut 400. This percentage is referred to as a "percentage of saturation" because the R"G"B" gamut 505 includes the same shades of colors as the RGB gamut 400 but not necessarily the same saturation. That is, the purest red of the R"G"B" gamut 505 will include more white (making it more pink) than will the purest red of the sRGB gamut 400.

Accordingly, the R"G"B" gamut 505 is the gamut that best approximates the sRGB gamut 400 for the monitor with associated R', G' and B' color points. Thus, the attenuation and mixing matrix for such a monitor is applied, as previously described, so that the RGB values are mapped into the R"G"B" gamut 505 instead of the sRGB gamut 400.

In conclusion, one embodiment of the present invention provides for producing and displaying true-color by measuring the red, green and blue color points of each manufactured monitor. These measured color points are then associated with the monitor and stored so that they are accessible to a computer processor. For a non-sRGB monitor to display true-color, the color points for that monitor are retrieved and an attenuation and mixing matrix is calculated. This matrix is then applied to RGB values to produce corrected RGB values that are supplied to the display.

Those skilled in the art, however, can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions will fall within the scope and spirit of the disclosed invention as expressed in the claims.

What is claimed is:

1. A method for providing color corrected images to a monitor that includes a display screen and a storage device, the method comprising the acts of:
   activating a first color scheme on the monitor;
   responsive to the activating of the first color scheme, measuring a first color point of the monitor;
   storing the first color point in the storage device;
   activating a second color scheme on the monitor;
   responsive to the activating of the second color scheme, measuring a second color point of the monitor;
   storing the second color point in the storage device;
   activating a third color scheme on the monitor;
   responsive to the activating of the third color scheme, measuring a third color point of the monitor;
   storing the third color point in the storage device; and
   wherein the first color point, the second color point and the third color point comprise color correction data that may be used to provide a color corrected output to the monitor in response to a selection of a user-selected image.

2. The method of claim 1, wherein the step of activating the first color scheme comprises the step of displaying a full-intensity red;

wherein a green and a blue are displayed at zero intensity.

3. The method of claim 2, wherein the step of activating the second color scheme comprises the step of displaying a full-intensity green;

wherein a red and a blue are displayed at zero intensity.

4. The method of claim 3, wherein the step of activating the third color scheme comprises the step of displaying a full-intensity blue;

wherein a green and a red are displayed at zero intensity.

5. The method of claim 1, further comprising the steps of:

reading the first, second and third color points from the storage device;

generating an attenuation and mixing matrix corresponding to the first, second and third color points;

receiving an RGB value for a pixel;

generating a corrected RGB value for the pixel by applying the attenuation and mixing matrix to the received RGB value.

6. A method for use in a monitor that includes a display screen and a storage device, the method comprising the acts of:

activating a first color scheme on the monitor by displaying a full-intensity red, wherein a green and a blue are displayed at zero intensity;

responsive to the activating of the first color scheme, measuring a first color point of the monitor;

activating a second color scheme on the monitor;

responsive to the activating of the second color scheme, measuring a second color point of the monitor;

activating a third color scheme on the monitor;

responsive to the activating of the third color scheme, measuring a third color point of the monitor;

generating an attenuation and mixing matrix corresponding to the measured first, second, and third color points;

storing at least a portion of the attenuation and mixing matrix in the storage device; and wherein the at least a portion of the attenuation and mixing matrix is used to provide a color corrected output to the monitor in response to a selection of a user-selected image.

7. The method of claim 6, wherein the step of activating the first color scheme comprises the step of displaying a full-intensity green;

wherein a red and a blue are displayed at zero intensity.

8. The method of claim 6, wherein the step of activating the first color scheme comprises the step of displaying a full-intensity blue;

wherein a green and a red are displayed at zero intensity.

9. The method of claim 6 further comprising the steps of:

receiving an RGB value for a pixel;

generating a corrected RGB value by applying the attenuation and mixing matrix to the received RGB value.

10. The method of claim 9, further comprising the steps of:

manually selecting the pixel for display in corrected color; and operating the monitor in accordance with the corrected RGB value responsive to the pixel being selected.

11. A method for displaying color on a monitor that comprises a display screen and a storage device, the color comprising a plurality of color points, the method comprising the acts of:

reading a plurality of color points from the storage device, the plurality of color points associated with an output of the monitor;

receiving RGB values for pixels that correspond to a user-selected image; and generating a corrected RGB value that approximates a SRGB value for the pixels with the color points and plurality of the received RGB values.

12. The method of claim 11, the generating step comprises the step of:

generating an attenuation and mixing matrix corresponding to the first, second and third color points.

13. The method of claim 11, further comprising the steps of:

selecting the pixel of the display device; and operating the display device in accordance with the corrected RGB value responsive to the pixel being selected.

14. A method for use in a monitor that includes a display screen and a storage device, the method comprising the acts of:

activating a color scheme on the monitor;

responsive to the activating of the color scheme, measuring a color point of the monitor;

storing the color point in the storage device; and wherein the color point may be used for performing color compensation in response to a selection of a user-selected image.

15. The method of claim 14, comprising displaying a full-intensity red; and wherein a green and a blue are displayed at zero intensity.

16. The method of claim 14, comprising activating a second color scheme by displaying a full-intensity green; and wherein a red and a blue are displayed at zero intensity.

17. The method of claim 14, comprising activating a second color scheme by displaying a full-intensity blue; and wherein a green and a red are displayed at zero intensity.

18. The method of claim 14, comprising generating an attenuation and mixing matrix corresponding to the color point.

19. The method of claim 18, comprising:

receiving an RGB value for a pixel; and generating a corrected RGB value for the pixel by applying the attenuation and mixing matrix to the received RGB value.

20. The method of claim 14, wherein the recited acts are performed in the recited order.

21. A method for use in a monitor that includes a display screen and a storage device, the method comprising the acts of:

activating a first color scheme on the monitor;

responsive to the activating of the first color scheme, measuring a first color point of the monitor;

activating a second color scheme on the monitor;

responsive to the activating of the second color scheme, measuring a second color point of the monitor;

activating a third color scheme on the monitor;

responsive to the activating of the third color scheme, measuring a third color point of the monitor;

generating an attenuation and mixing matrix corresponding to the measured first, second, and third color points; and storing at least a portion of the attenuation and mixing matrix in the storage device; and wherein the at least a portion of the attenuation and mixing matrix is used to provide a color corrected output to the monitor in response to a selection of a user-selected image.

22. The method of claim 21, comprising displaying a full-intensity red; and wherein a green and a blue are displayed at zero intensity.

23. The method of claim 21, comprising displaying a full-intensity green; and wherein a red and a blue are displayed at zero intensity.

24. The method of claim 21, comprising displaying a full-intensity blue; and wherein a green and a red are displayed at zero intensity.

25. The method of claim 21 comprising:

receiving an RGB value for a pixel; and generating a corrected RGB value by applying the attenuation and mixing matrix to the received RGB value.

26. The method of claim 25, comprising:

manually selecting the pixel for display in corrected color; and operating the monitor in accordance with the corrected RGB value responsive to the pixel being selected.

27. The method of claim 21, wherein the recited acts are performed in the recited order.

28. A display device, comprising:

a memory adapted to store color compensation data, the color compensation data being used to color compensate the display device in response to a selection of a user-selected image; and wherein the color compensation data is not used to color compensate images other than the user-selected images.

29. The display device of claim 28, wherein the color compensation data comprises at least one color point.

30. The display device of claim 28, comprising a computer system that is adapted to read the color compensation data from the memory and generate an attenuation and mixing matrix corresponding to the color compensation data.

31. The display device of claim 30, wherein the computer system is adapted to receive an RGB value for a pixel and generate a corrected RGB value for the pixel by applying the attenuation and mixing matrix to the received RGB value.

32. The display device of claim 30 wherein the computer system comprises:

a processor for executing instructions;

a hard drive for storing data; and a user input device.

* * * * *